United States Patent [19]
Hanemaayer

[11] Patent Number: 5,639,141
[45] Date of Patent: Jun. 17, 1997

[54] RECREATIONAL VEHICLE HAVING CONVERTIBLE FRONTAL SEATING TO PROVIDE DINETTE AND SLEEPING FACILITIES

[76] Inventor: Jacobus N. Hanemaayer, 100 Shirley Avenue, Kitchener, Ontario, Canada, N2B 2E1

[21] Appl. No.: 355,039

[22] Filed: Dec. 13, 1994

[30] Foreign Application Priority Data

Jun. 9, 1994 [CA] Canada ................................ 2125531

[51] Int. Cl.$^6$ .................................................. B60P 3/34
[52] U.S. Cl. ..................... 296/156; 296/37.15; 296/64; 296/69; 5/3; 5/118
[58] Field of Search ........................... 296/156, 37.15, 296/64, 69; 5/3, 118

[56] References Cited

U.S. PATENT DOCUMENTS

| | | | |
|---|---|---|---|
| 1,834,817 | 12/1931 | Woodfin | 296/37.15 |
| 3,165,350 | 1/1965 | Willson | 296/69 |
| 3,391,960 | 7/1968 | Megargle et al. | 296/64 |
| 3,636,892 | 1/1972 | Linton | 5/3 |
| 3,866,548 | 2/1975 | Skonieczny | 5/3 |
| 3,880,458 | 4/1975 | Jackson | 5/3 |
| 4,341,415 | 7/1982 | Braun et al. | 296/69 |
| 4,685,719 | 8/1987 | Hanemaayer | 5/118 |
| 4,685,729 | 8/1987 | Heesch et al. | 296/37.15 |

FOREIGN PATENT DOCUMENTS

| | | | |
|---|---|---|---|
| 1200262 | 2/1986 | Canada . | |
| 2311288 | 9/1973 | Germany | 296/69 |

OTHER PUBLICATIONS

Embassy brochure.
Commander brochure.
Bounder brochure.
Imperial brochure.
Endeavor brochure.
Winnebago brochure.
Pace Arrow brochure.
Fleetwood brochure.
Sea Breeze brochure.
Luxor brochure.

*Primary Examiner*—Gary C. Hoge
*Attorney, Agent, or Firm*—Killworth, Gottman, Hagan & Schaeff

[57] ABSTRACT

A system or structure allowing conversion of the front area seating of a van to a dinette for two and/or four persons and to a single and/or double bed. The structures provided enable the front passenger seat to rotate 360 degrees and slide over a position adjacent to the driver seat which also can be rotated 360 degrees. The single seat directly behind the driver seat can be extended sideways to form a double seat. The table in between the front seats and seat directly behind these seats is cantilevered from a wall cabinet located below the window, which is located in the exterior sidewall directly behind the driver seat. This table is removable at will for storage in a coat closet or lowered to serve as a base for a single or double bed. The two part hinged front leaf may be folded back over the main rear leaf to allow ample space for the driver seat to slide back and forth on tracks when in the forward driving position. When the table is lowered to the bed base position, the rear seat cushion(s) is moved forward thereby resting on the lowered table. The back rest(s) is lowered into the location of the seat cushion. The two front seats are rotated to face one another with the passenger seat slid over to a position directly adjacent the driver seat. The arrangement makes for a double bed or a single bed if only the driver seat and the cushions (without the extensions) of the rear seating are used.

21 Claims, 19 Drawing Sheets

RECREATIONAL VEHICLE HAVING CONVERTIBLE FRONTAL SEATING TO PROVIDE DINETTE AND SLEEPING FACILITIES

BACKGROUND OF THE INVENTION

This invention relates to improvements in recreational vehicles and in particular, to a recreational vehicle wherein the front area seating is convertible to a dinette and/or sleeping facilities.

There are many types of recreational vehicles and the present invention is particularly applicable to camper van conversions which involve the conversion of a commercial cargo van. Most of these camper van conversions, officially known in the industry as Class B Recreational Vehicles, are built using extended body commercial cargo vans. However, several of the automotive manufacturers, including General Motors Corporation, make three different lengths of cargo vans, the short, standard, and extended body length, most of these having different wheel base lengths as well. Regardless of the van size, it is of importance that the available space be used efficiently and that multiple use of facilities be provided wherever practical.

My earlier Canadian Patent No. 1,200,262 issued Feb. 4, 1986 discloses a recreational vehicle wherein the van is provided with uniquely designed movable partitions to create a central privacy area in the van interior. This is a good example of a "space saver" innovation which makes dual use of available space. The interior structures and lay-out described in the above-identified patent can be used in various lengths of cargo vans.

SUMMARY OF THE INVENTION

The present invention also relates generally to the saving of available space and to multiple usage of facilities and in particular to structures providing for the conversion of the front area seating of a camper wan to a dinette for two-four persons and also to a single and/or double bed.

Thus, in one aspect there is provided a recreational vehicle including, within a forwardly disposed region of the vehicle interior, a driver's seat and a front passenger seat located generally in a side-by-side relationship adjacent a frontal portion of the vehicle interior. A rear passenger seat is located rearwardly of the driver's seat in spaced relation thereto. A table is locatable in the space between the rear passenger seat and the driver seat. The driver's and front passenger seats are mounted for rotation about respective vertical axes to enable them to face forwardly in a driving mode, to face generally rearwardly in a dining mode and to face each other in a sleeping mode. The front passenger seat also is movable laterally of the van interior toward and away from the driver's seat to enable the front passenger seat and driver's seat to be placed in close relation to each other. The rear passenger seat includes movable cushions enabling same to be converted into a portion of a bed. Means are provided for supporting the table at a high level dining position and also at a lower level sleeping position compatible with the levels of the rear passenger seat and said driver and front passenger seats for support of cushions on said table thereby to define, together with said converted rear passenger seat and at least said driver's seat, a bed for use in the sleeping mode.

In a further aspect of the invention said rear passenger seat includes a seat cushion and a backrest cushion, said seat cushion being positionable on said table when in the lower level sleeping position and said backrest cushion being movable to a horizontal position rearwardly of the seat cushion to form a part of the bed.

In a still further aspect of the invention said seat cushion and backrest cushion are adjustable inwardly or outwardly relative to the longitudinal centre line of the van interior to provide increased bed width in the sleeping mode and to provide increased seating width when in the dining/sitting mode.

In a preferred embodiment there is provided auxiliary cushions insertable between said seat and backrest cushions and an adjacent portion of the vehicle sidewall when the latter cushions have been adjusted inwardly.

As a further feature said table comprises a plurality of leaves hinged together so that said leaves may be folded into close juxtaposition with one another to conserve/provide extra space.

Still further there may be provided means for supporting said table in cantilever fashion from an end of the table adjacent a sidewall of the vehicle when in the high level dining position.

In a preferred embodiment said vehicle includes a dropped floor section, and a floor extension movable over a portion of the dropped floor section to provide extra foot room when said rear passenger seat and backrest cushions have been adjusted inwardly toward said centre line.

Still further according to another feature of the invention said driver and front passenger seats are supported on respective seat bases, each defining an enclosure for storage, and the base for said passenger seat being mounted on tracks to provide said lateral movement, and stop means to secure the movable seat base in selected lateral positions.

Other features of the invention will become apparent from the following description and the appended claims.

DESCRIPTION OF THE VIEWS OF DRAWINGS

FIG. 1 is a top plan view of the recreational vehicle interior wherein the solid lines of the seats and table show the arrangement in the driving mode and the dashed lines show the arrangement in the dinette position, for four persons, with the front two seats rotated to a rearward facing position and the passenger seat slid over towards the table, the rear seat being extended sideways to provide space for two persons;

FIG. 1A is a further top plan view similar to FIG. 1 but which shows the arrangement in the living mode, the solid lines showing the seating in the double bed position and the dashed lines showing the outline of the various seat cushions, backrest(s) and the table directly below in the lowered position;

FIG. 2 is a further top plan view of the frontal portion of the recreational vehicle wherein the solid lines show the seating arrangement in the driving position and the dashed lines indicate the seat bases, pivoting supporting bracket under the table, outline of the supporting cabinet under the outside wall end of the table, outline of the front edge of the rear seat cushion under the table and the outline of the dropped floor which is partially under the floor of the rear seat base and the floor in front of the rear seat base;

FIG. 3 shows a section view along line A—A the location of which is indicated on FIG. 2, the seating arrangement being in the driving position;

FIG. 4 is a partial top plan view of an alternate seating arrangement showing the dinette in position for two persons. The driver's seat faces the table. The solid lines show the outline of the seat cushions, seat back rests, driver seat base, and line of the floor over the dropped floor in front of the rear seat base. The dashed lines show detail of the rear seat base, driver seat base, cantilevered table and outline of the dropped floor in front of the rear seat base;

FIG. 5 is a top plan view of another seating arrangement showing the dinette in position for four persons, the front seats facing towards the table, with the passenger seat partially slid over towards the driver's seat. The rear seat is extended sideways. The dashed lines show the front seat bases, pivoting support bracket under the table, the front edge of the rear seat cushion under the table and the extension of the floor in front of the rear seat base above the dropped floor;

Figure 9:
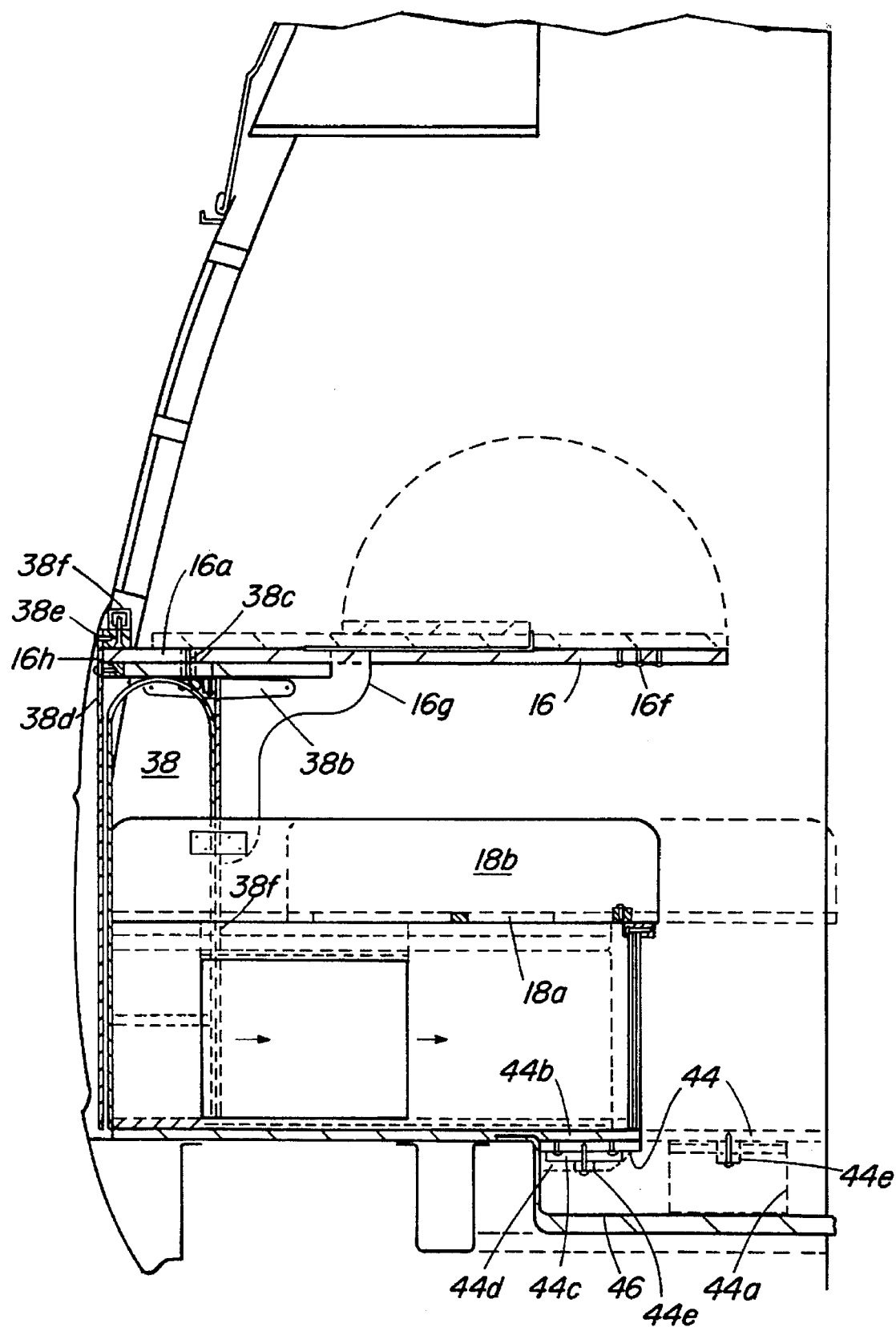
Figure 10:
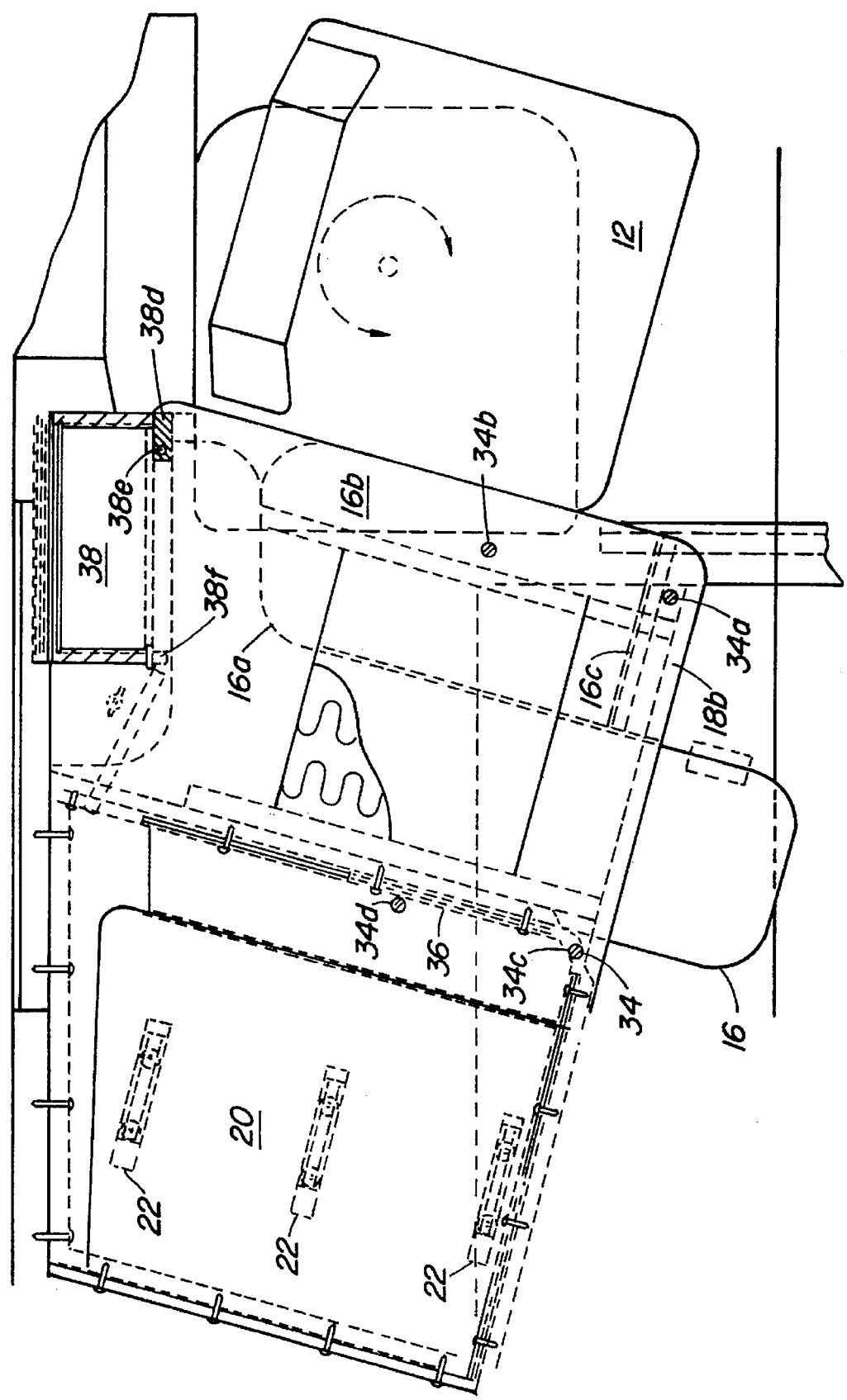
Figure 11:
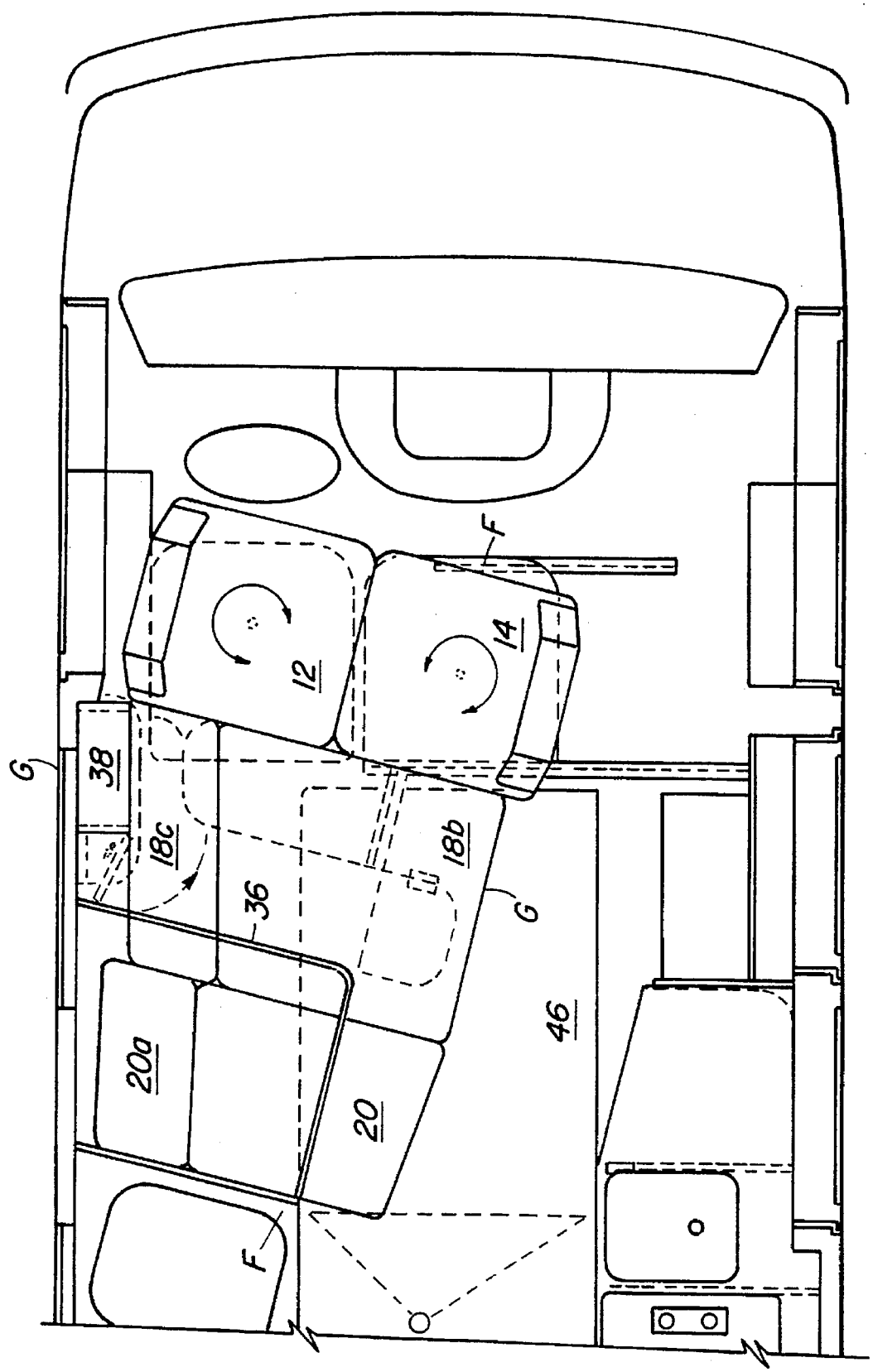
Figure 12:
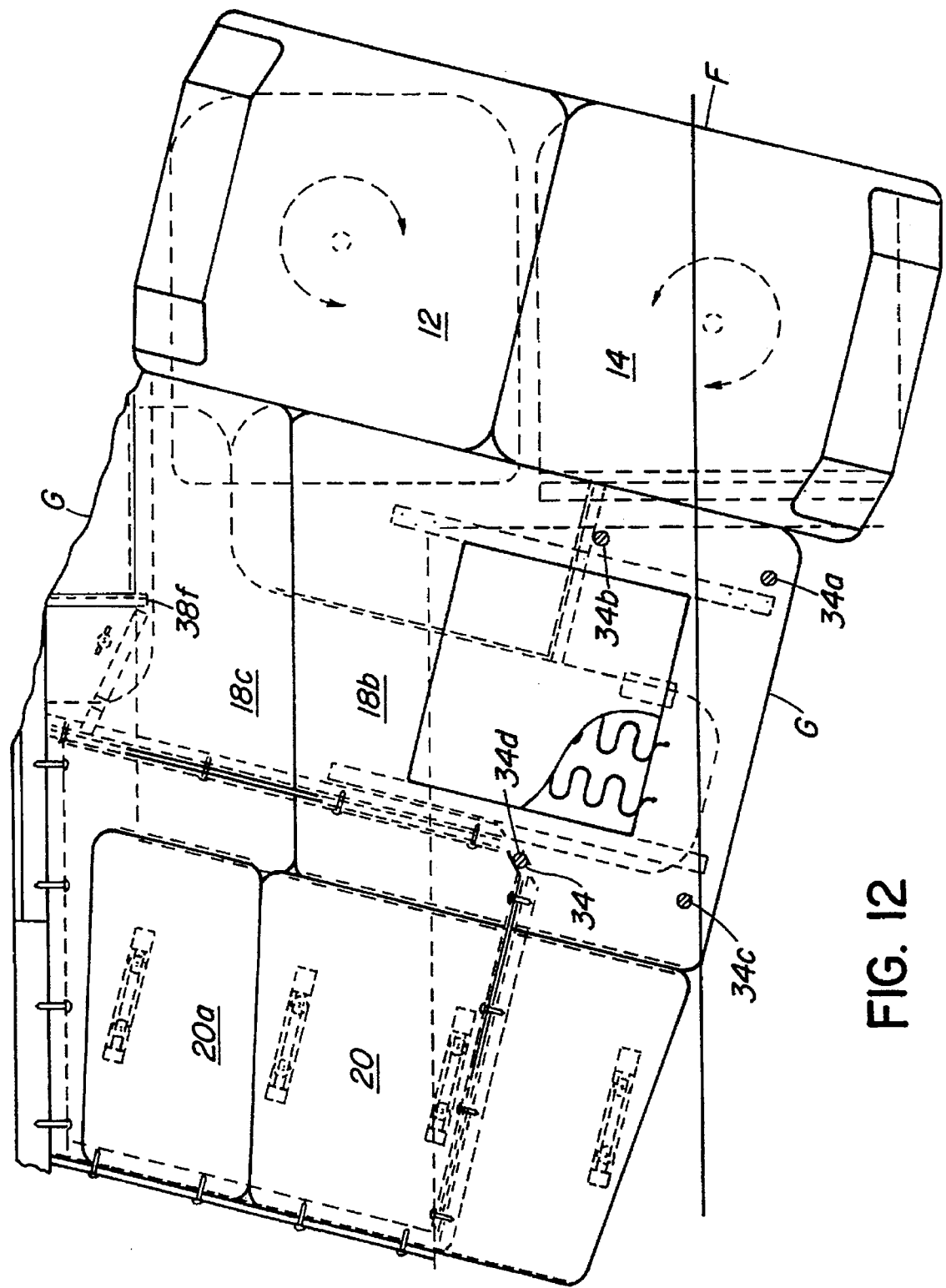
Figure 13:
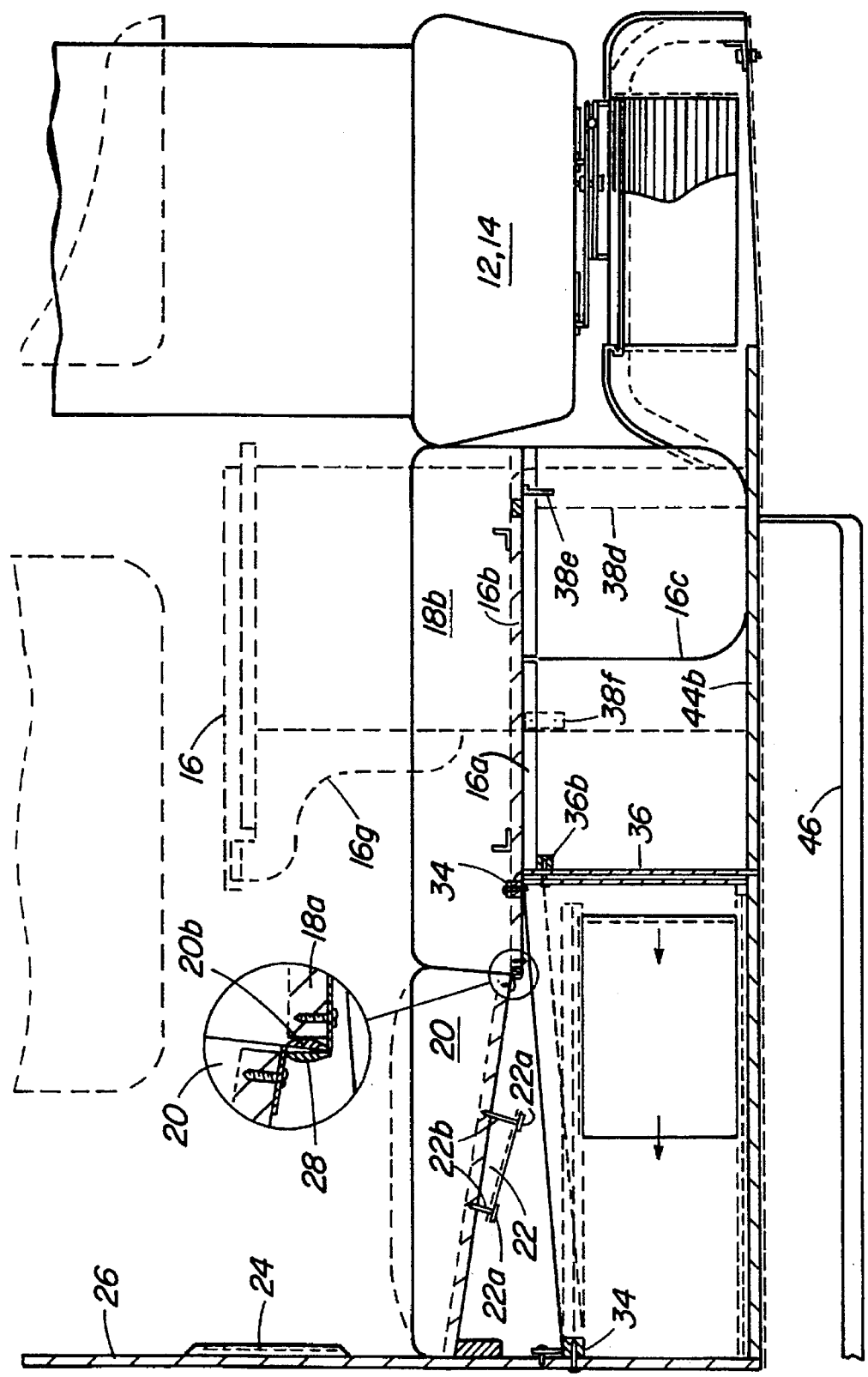
Figure 14:
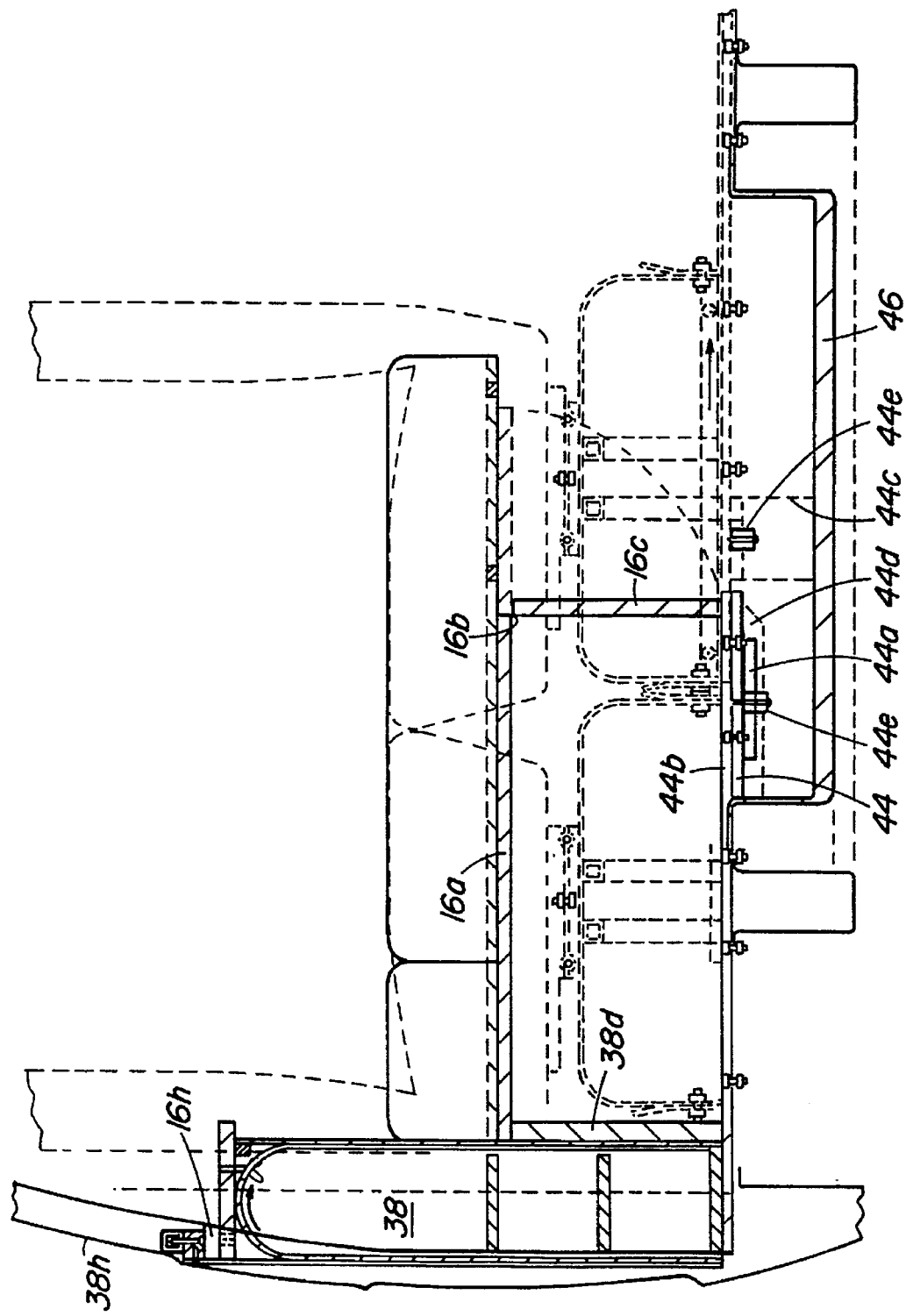
Figure 15:
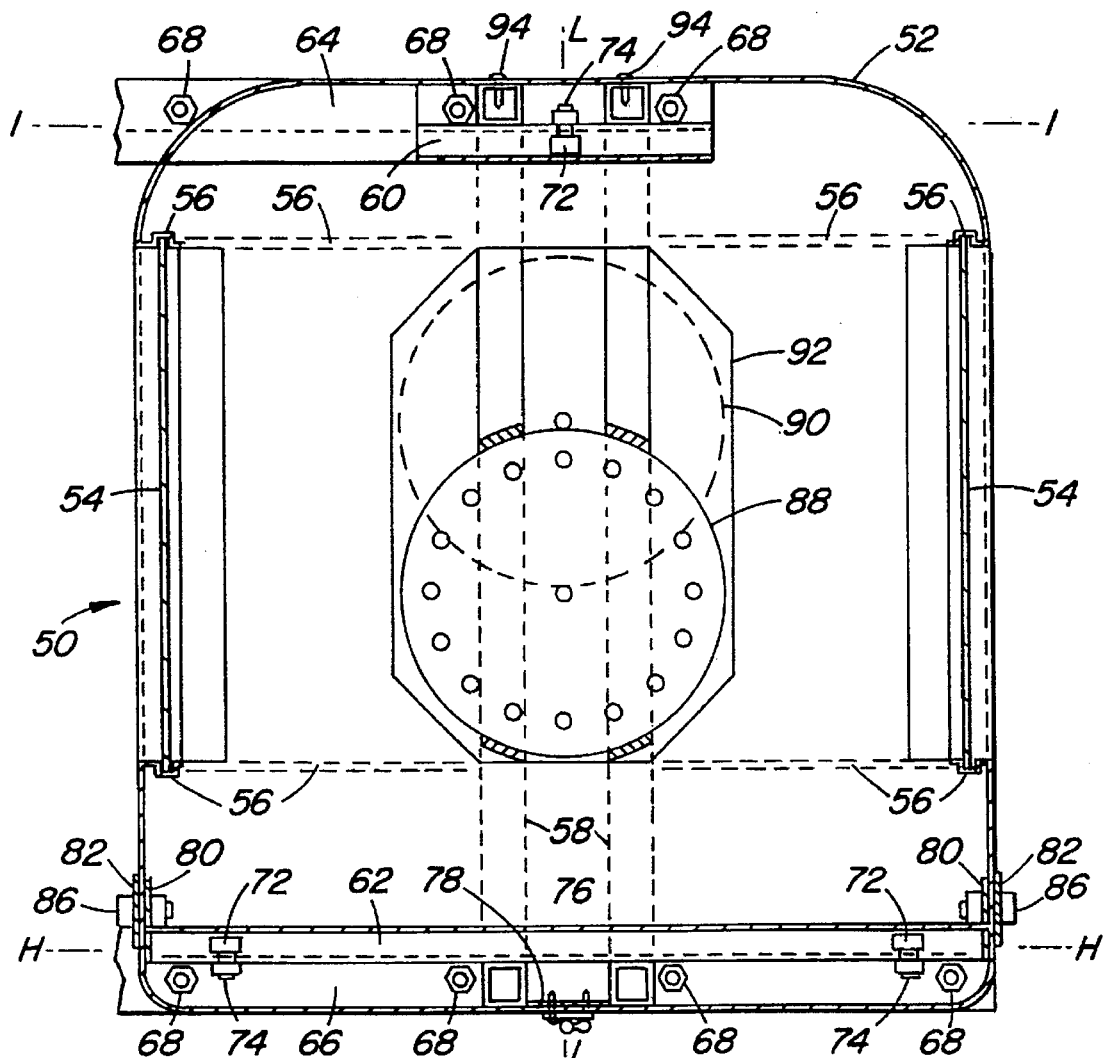
Figure 16:
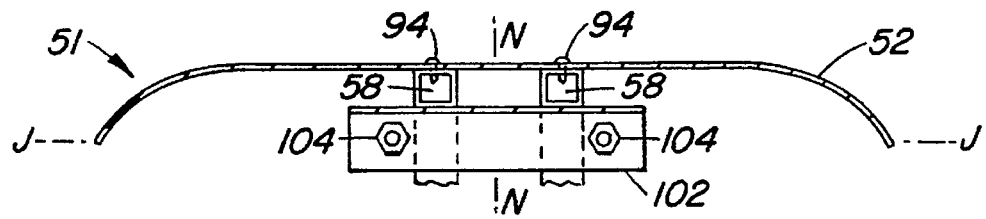
Figure 17:
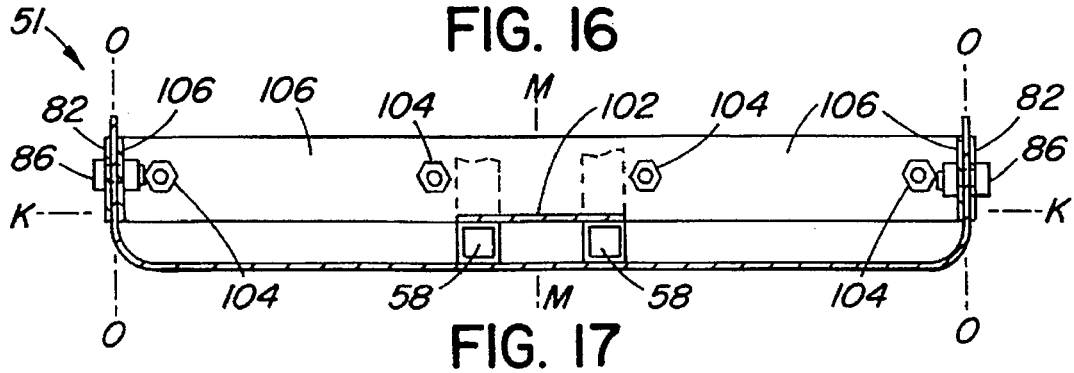
Figure 18:
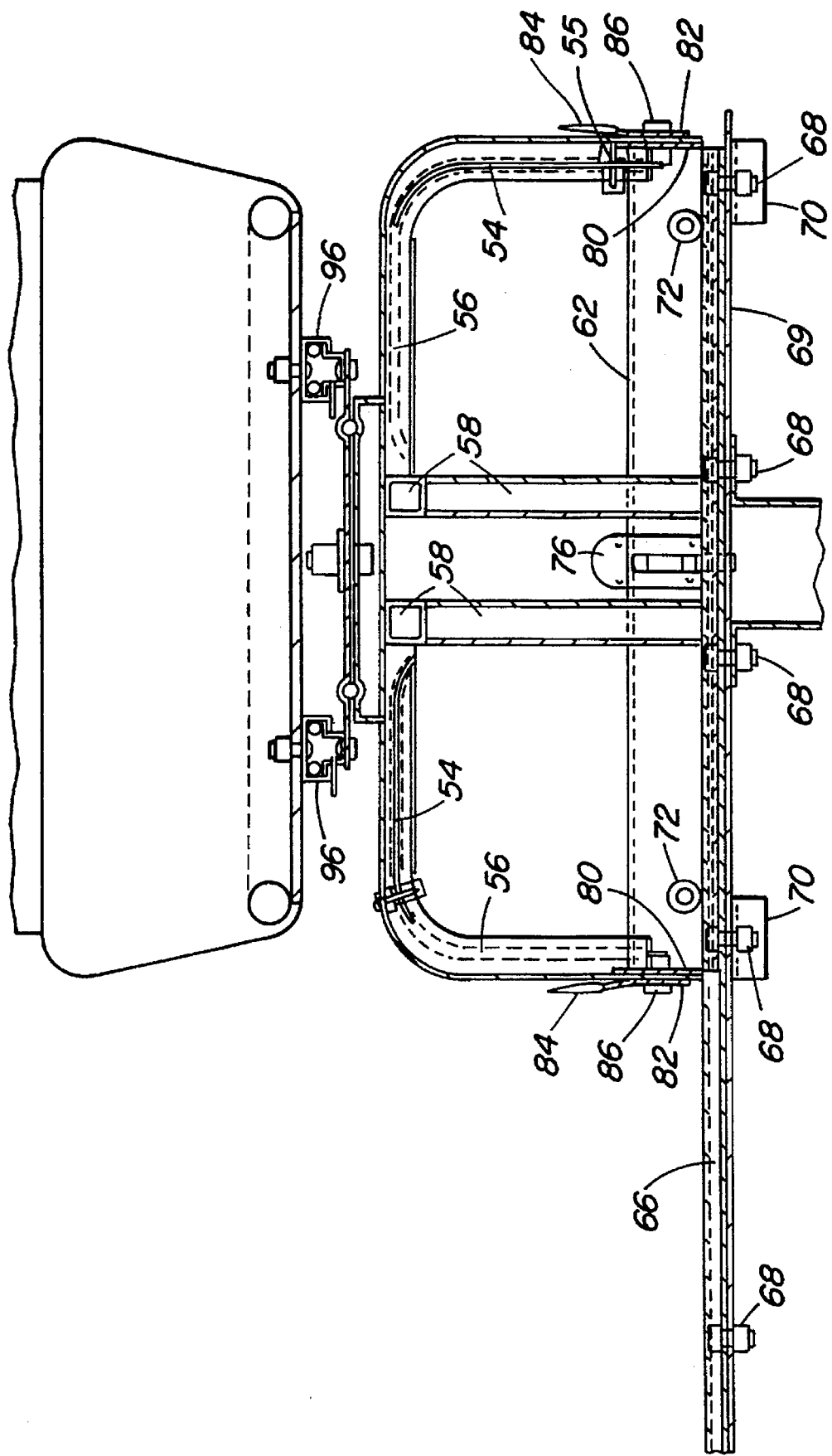
Figure 19:
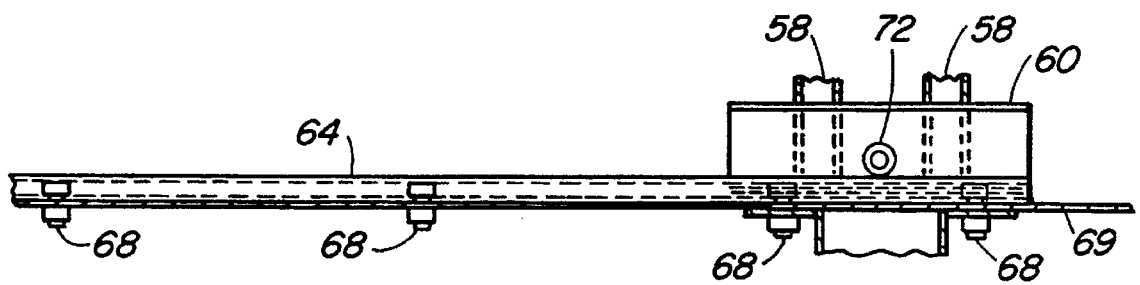
Figure 20:
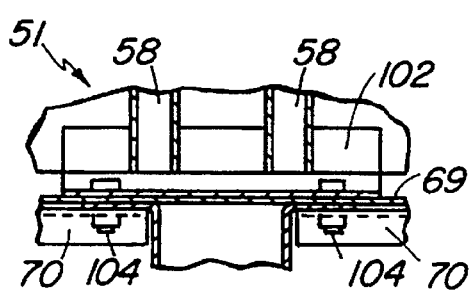
Figure 21:
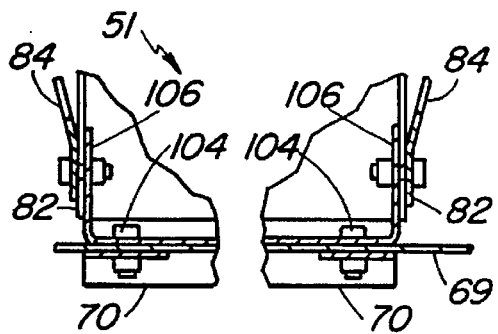
Figure 23:
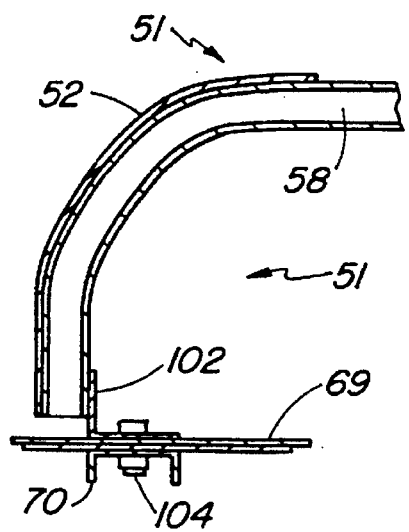
Figure 24:
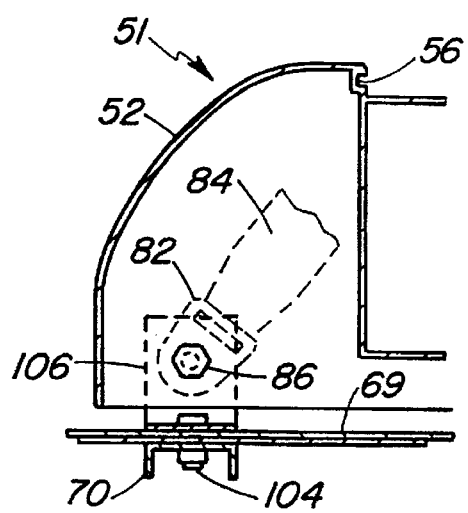
Figure 22:
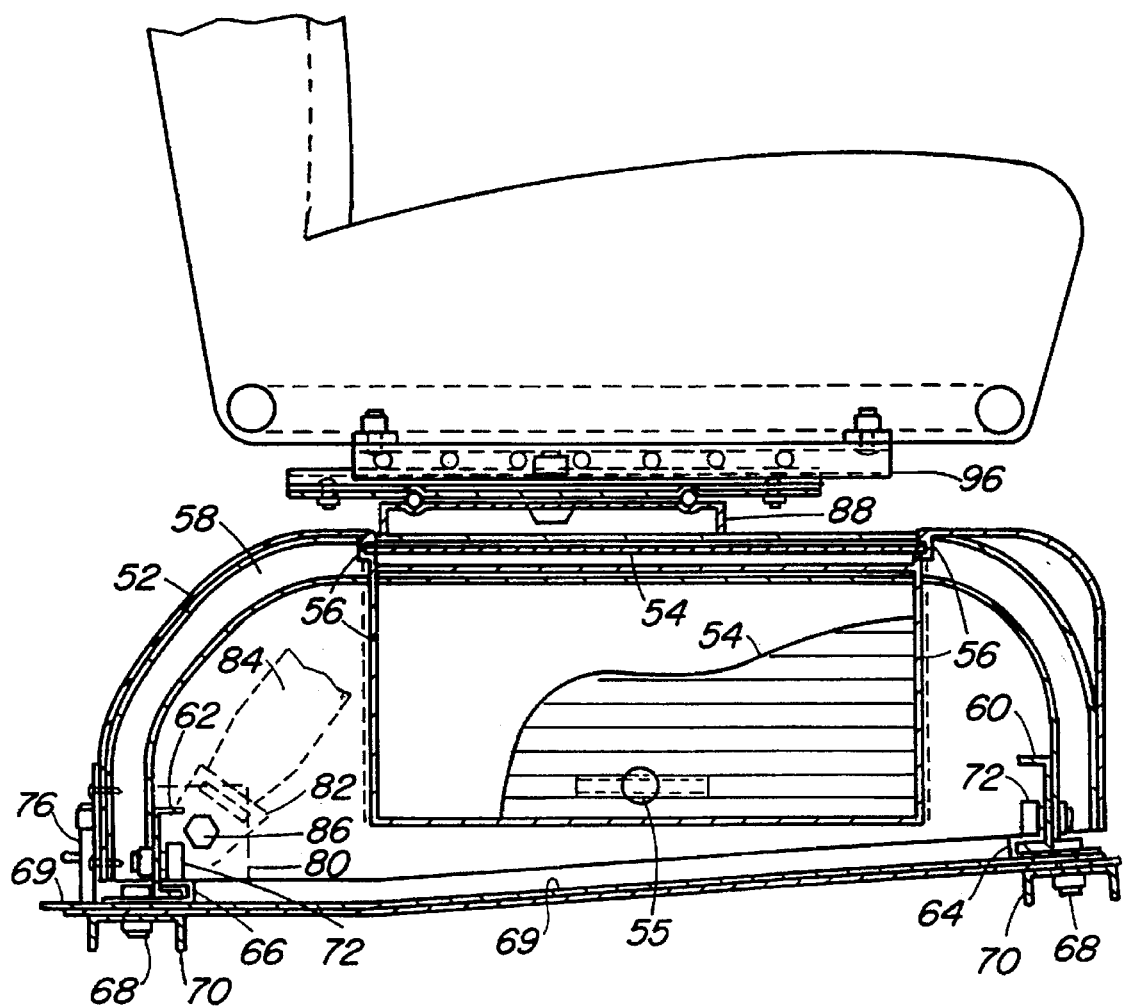

FIG. 9 is a section view along line E—E of the dinette table and its supporting cabinet and front edge of the single rear seat in solid lines and the extension for a double seat in dashed lines. The general location of this section is indicated on FIGS. 2, 4, 5 and 6. A floor extension in front of the rear seat base but over the dropped floor is shown in FIG. 9;

FIG. 10 is a top plan view showing an arrangement for a single bed. The solid lines indicate the outline of the various cushions and springs under the centre cushion and the driver's seat which is turned sideways facing inward. The dashed lines indicate the driver seat base, metal angles to support the rigid back (bottom) of the centre cushions, which has an opening for the seat springs, the rear seat base, the table in the lowered position and the tracks on the back of the back rest which is in the horizontal position here;

FIG. 11 is a further top plan view of the frontal portion of the recreational vehicle showing an arrangement for a double bed, the seat and backrest cushions being extended sideways, with extra cushions placed in the empty space created. The driver and passenger seats are turned sideways to face one another with the latter moved sideways up to the driver seat. The driver and passenger seats bases, the lowered table, the dropped floor section under the bed arrangement and the floor portion above the dropped floor are shown in dashed lines. The rear seat base is shown in solid lines;

FIG. 12 shows a similar arrangement as in FIG. 11 but also showing in dashed lines the tracks on the backrests, the front and rear seat bases, the table in the lowered position and the metal angles to support the rigid back (bottom) of the centre cushions, the larger of which has an opening in its centre for the seat springs. The opening and springs are shown in solid lines;

FIG. 13 is a section view through F—F the location of which is indicated on FIGS. 11 and 12. A roll-up door in the front seat base and a sliding door in the rear seat base are shown;

FIG. 14 is a section view generally through the centre of the double bed along line G—G as indicated on FIGS. 11 and 12. The cabinet supporting the cantilevered table (when up) is at left and the front seats in dashed lines are in the background;

FIG. 15 is a plan view of the sideways movable front passenger seat base on tracks. (A plan view of the complete tracks can be best seen on FIG. 11.) The swivel for this passenger seat is shown in solid lines and the driver swivel in dashed lines;

FIG. 16 is a partial horizontal section showing the front anchorage of the driver seat base which is fixed to the floor; (a section of this anchorage can be seen on FIG. 3);

FIG. 17 is a partial horizontal section showing the rear anchorage of the driver seat base. (The horizontally arranged bolts at the extreme right and left respectively, are for seat belt anchorage.);

FIG. 18 is a section view generally along line H—H at the rear area of the front passenger seat as indicated on FIG. 15. The bolts through the van floor anchors the fixed track. The horizontal bolts on the extreme right and left anchor the seat belts. The barrel bolt in the centre prevents the seat from moving sideways when engaged;

FIG. 19 is a section view showing the anchorage at the front of the passenger seat base. The track and anchorage is similar to the rear track and anchorage except it is shorter in length. (The plan view of this front anchorage can best be seen at section line I—I on FIG. 15.);

FIG. 20 is a section view of the front anchorage of the driver seat base, which can also be seen at section line J—J of the plan view on FIG. 16;

FIG. 21 is a section view of rear anchorage of the driver seat base and seat belts respectively. This can also be seen at K—K of the plan view on FIG. 17. The two centre bolts on this FIG. 17 are fastened in similar manner as seen in the section of FIG. 20;

FIG. 22 is a section view through the front passenger seat in the general area as indicated by section line L—L on the plan view of FIG. 15;

FIG. 23 is a section view through the rear centre area of the driver seat as indicated at section line M—M on FIG. 17. The anchorage of the front centre area is similar and is indicated on the plan view of FIG. 16 at N—N;

FIG. 24 is a section view through the rear outside corners of the driver seat as indicated at section line O—O on the plan view of FIG. 17. The anchorage shown on this FIG. 24 is for the seat base and seat belts respectively.

DETAILED DESCRIPTION OF THE PREFERRED EMBODIMENT

Figure 1:
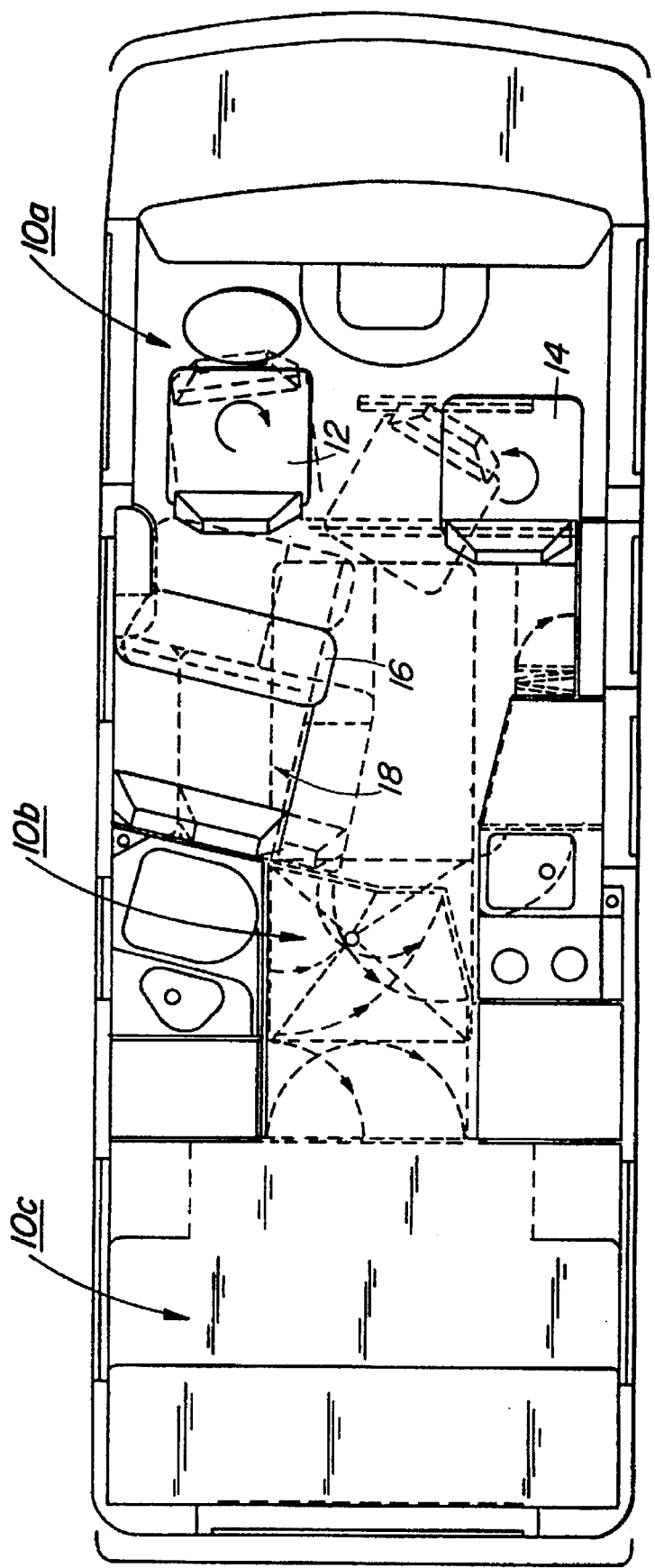

Referring firstly to FIG. 1, it is noted that, in general, solid lines show the driving mode while the dashed lines illustrate the living mode. The recreational vehicle interior includes a forwardly disposed seating area 10a, and a centrally located utility region 10b incorporating kitchen and toilet facilities and which may be segregated to provide a central privacy area. The rearward region 10c of the van interior 10 is provided with one or more beds and any desired storage facilities for clothing etc.

With reference to the forwardly disposed seating region 10a there is provided a driver's seat 12 and a front passenger seat 14 located generally in a side-by-side relationship. The mounting structures for these seats will be described hereafter and it is sufficient to state that they can both turn or swivel 360° about respective vertical axes. A rear passenger seat assembly 18 is located rearwardly of the driver's seat 12 in spaced relation to it. A table structure 16 is locatable in the space between the rear passengers seat 18 and the driver's seat 12.

Figure 1A:
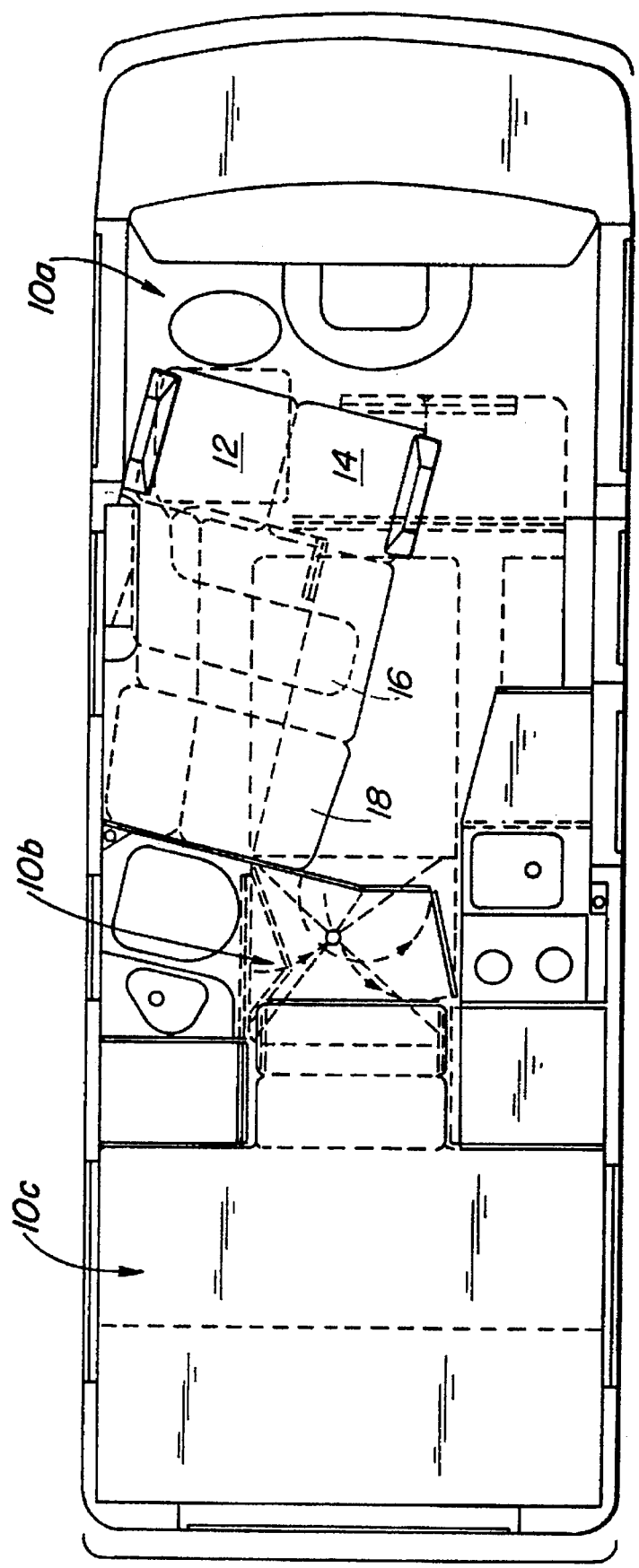

Since the driver's and front passenger seats 12 and 14 can swivel about respective vertical axes, they can face forwardly while in the driving mode (see full line positions in FIG. 1); alternatively, they can face generally rearwardly while in a dining mode (see dashed line positions in FIG. 1) and, still further, they can face each other while in a sleeping mode (see full line positions in FIG. 1A).

The front passenger seat 14 is also movable laterally of the van interior toward and away from the driver's seat 12 to enable these seats to be spaced apart as in the driving mode and to enable the front passenger seat 14 to be placed in close juxtaposition to the driver's seat 12 for use in either the dining mode or the sleeping mode.

The rear passenger seat 18 includes movable cushions to be described in more detail hereafter enabling same to be converted into a portion of a bed as illustrated in FIG. 1A.

Figure 2:
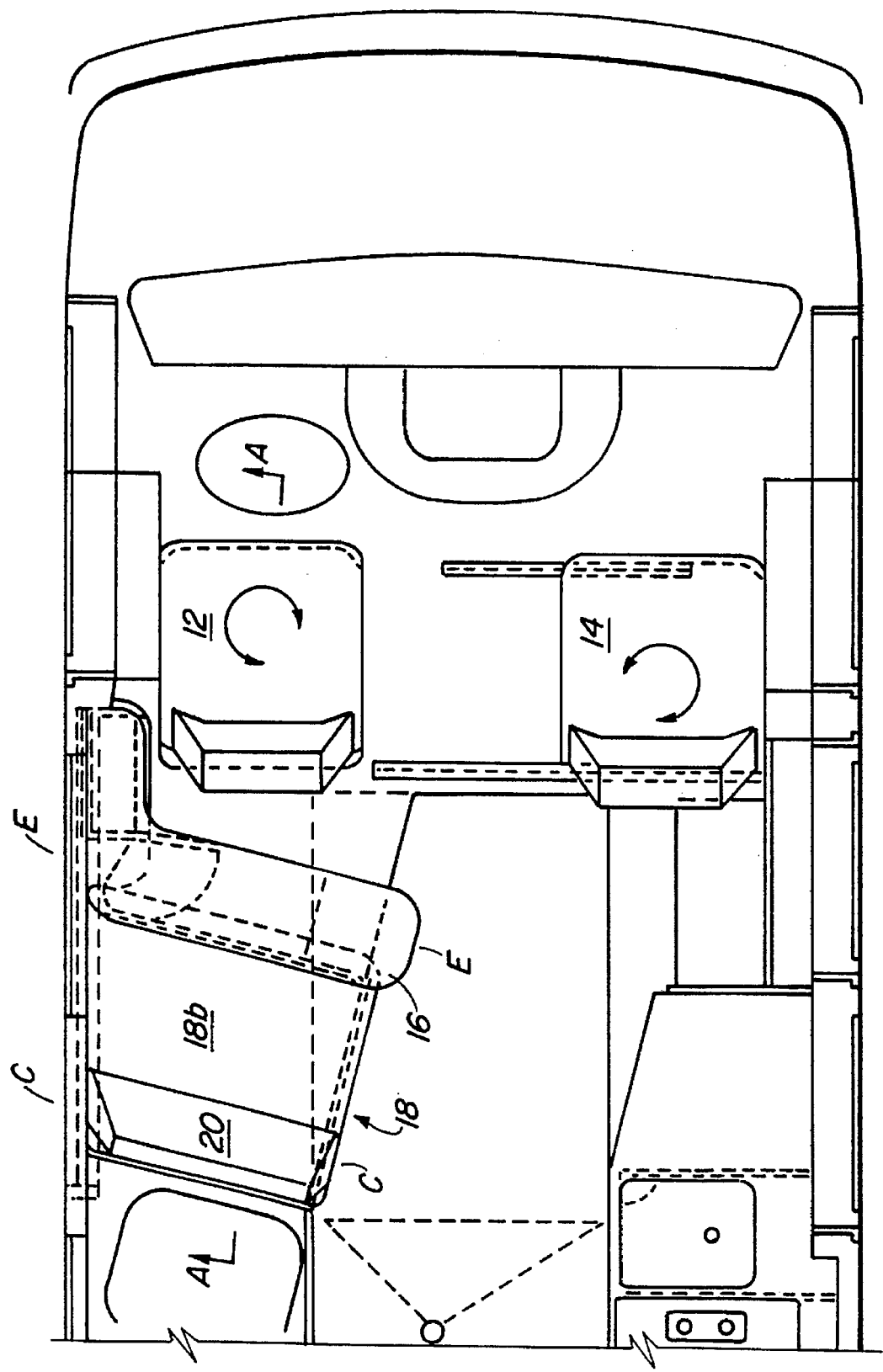

Means to be described hereafter are provided for supporting the table 16 at a higher level dining position as in FIGS. 1 or 2, and also at a lower level sleeping position as illustrated in FIG. 1A. The lower level sleeping position is compatible with the levels of the rear passenger seat 18 and the levels of the driver and front passenger seats 12 and 14 to enable support of cushions on the support surface defined by table 16. In this lower level position the table 16 defines, together with the front seats 12 and 14 and the converted rear passenger seat 18, a bed for use in the sleeping mode.

As will be described in further detail hereafter, the rear passenger seat includes a seat cushion 18b and a backrest cushion 20. Seat cushion 18b is positioned on the table 16 when the latter is in the lower level sleeping position and the backrest cushion 20 is located in a horizontal position rearwardly of seat cushion 18b to form a part of the bed. The opposite end of the bed is of course formed by the closely positioned driver and front passenger's seat 12 and 14.

Seat cushion 18b and backrest cushion 20 are adjustable laterally inwardly or outwardly relative to the longitudinal centre line of the van interior to provide increased bed width when in the sleeping mode and also to provide increased seating width in the dining or sitting mode. Auxiliary cushions 18c and 20a are insertable between the seat cushion 18b and backrest cushion 20 to fill up the gaps created when the above-noted cushions have been adjusted laterally inwardly.

As will be described in detail hereafter, the table 16 comprises a plurality of leaves hinged together so that these leaves may be folded into close juxtaposition with one another to provide extra space when required. Suitable means are provided for supporting table 16 in cantilever fashion adjacent a side wall of the vehicle when in the high level dining position.

Another feature to be described in more detail hereinafter includes a dropped floor section 46 in the central portion of the van with a floor extension 44 being movable outwardly over a portion of the dropped floor section to provide extra foot room when the rear passenger seat 18b and backrest 20 have been adjusted inwardly as described above.

Figure 3:
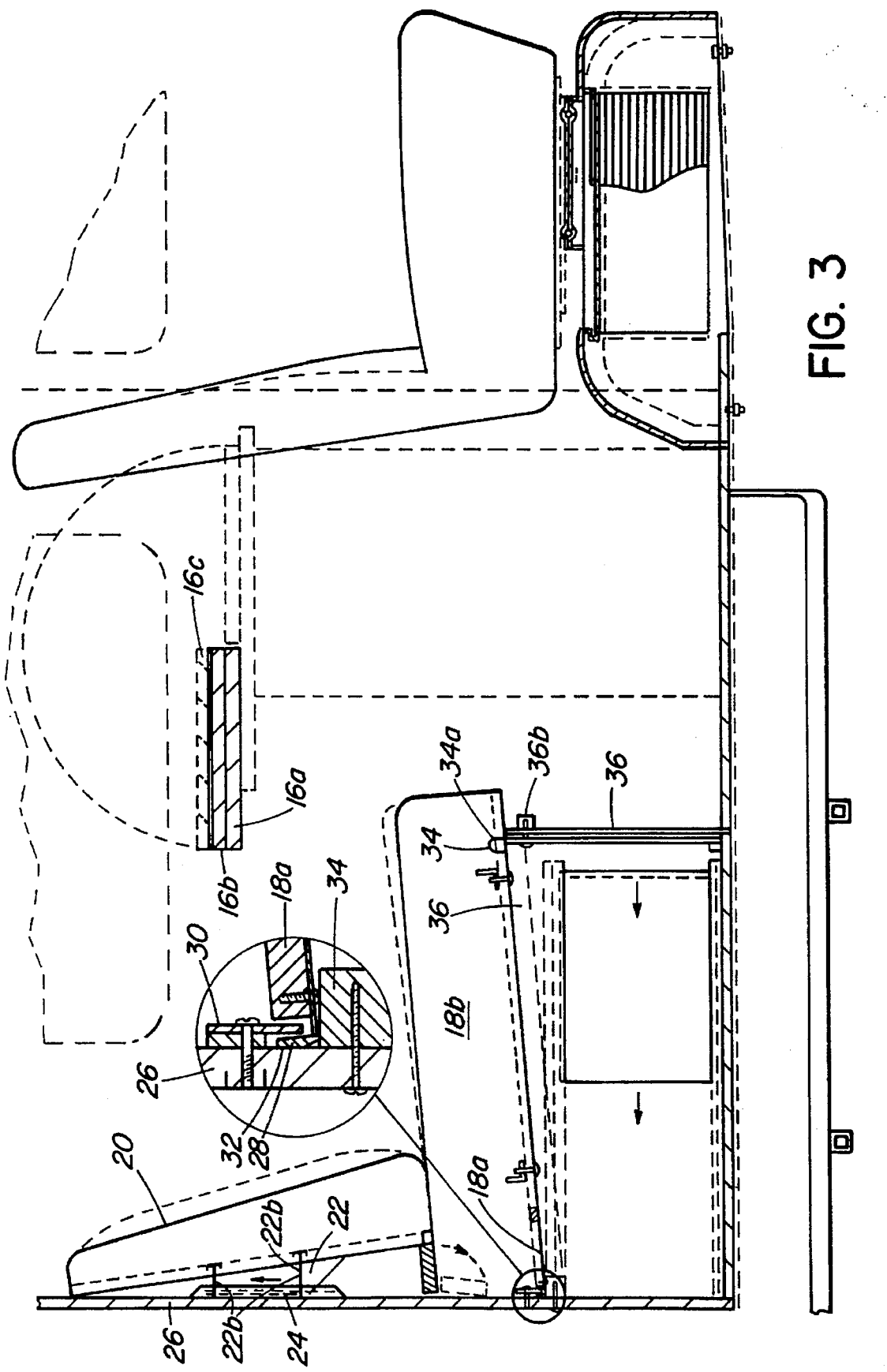

Referring now to FIG. 3, the cantilevered and removable table 16 consists of a main leaf 16a, a second leaf 16b which is hinged to leaf 16a and a third leaf 16c hinged to leaf 16b. In order to provide ample space for the driver seat 12 to slide back and forth on its tracks 96, table leaves 16b and 16c are folded (swung) over leaf 16a. Such can be clearly seen in the cross section of FIG. 3.

With continued reference to FIG. 3 rear seat cushion 18b and rear seat backrest 20 are in a mode to accommodate one adult person. The position and locking in place of this rear seat cushion 18b and rear seat backrest 20 can be seen in detail on the cross section of FIG. 3, located on A—A on FIG. 2. The backrest 20 is held from falling forward by male tracks 22 bolted to its back. Corresponding female tracks 24 are secured to the adjacent partition 26. Backrest 20 can be removed by lifting it upwards. The rear seat cushion 18b is held in place by a rigid angle 28 secured to the rigid base 18a of the seat cushion 18b which hooks under a double flat bar 30 of two different width (thereby forming a slot or track 32) secured to fixed partition 26. The angle 28 rests on a rigid strip 34 also secured to partition 26. The slot 32 and the strip 34 prevent the up or downward movement of the angle 28. The seat cushion 18b may be removed by lifting the front edge off a knob 34 which is secured on the front inward corner of the rear seat base 36. This knob 34 fits in a corresponding hole 34a in the rigid base 18a of the seat cushion 18b. Once seat cushion 18b is lifted it can be removed by sliding the rigid angle 28 out of the slot 32.

Figure 4:
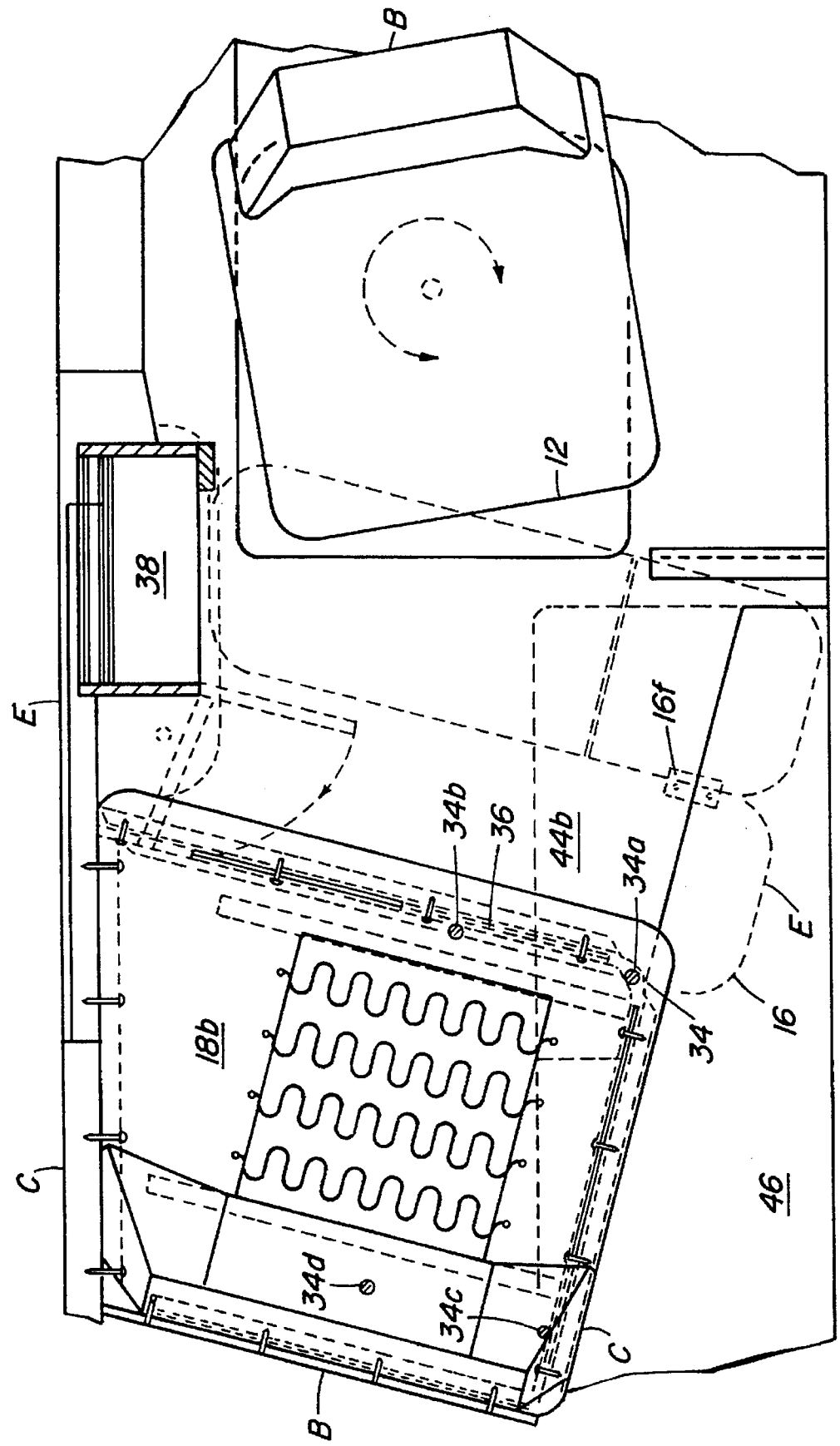

FIG. 4 shows the dinette mode for two persons. The knob 34 at the front inward corner of the rear seat base 36 is shown in cross hatching and is locked in a corresponding hole 34a in the rigid base 18a of the seat cushion 18b. There are three more holes 34b, 34c and 34d in the rigid base 18a of the seat cushion 18b for forward and sideways adjustment, which will be referred to later. The cantilevered table 16 is shown in dashed lines and is fully extended in this FIG. 4. The cabinet 38 supporting the cantilevered table 16 is shown in solid lines. The driver seat 12 is in a rearward facing position towards the table 16.

Figure 5:
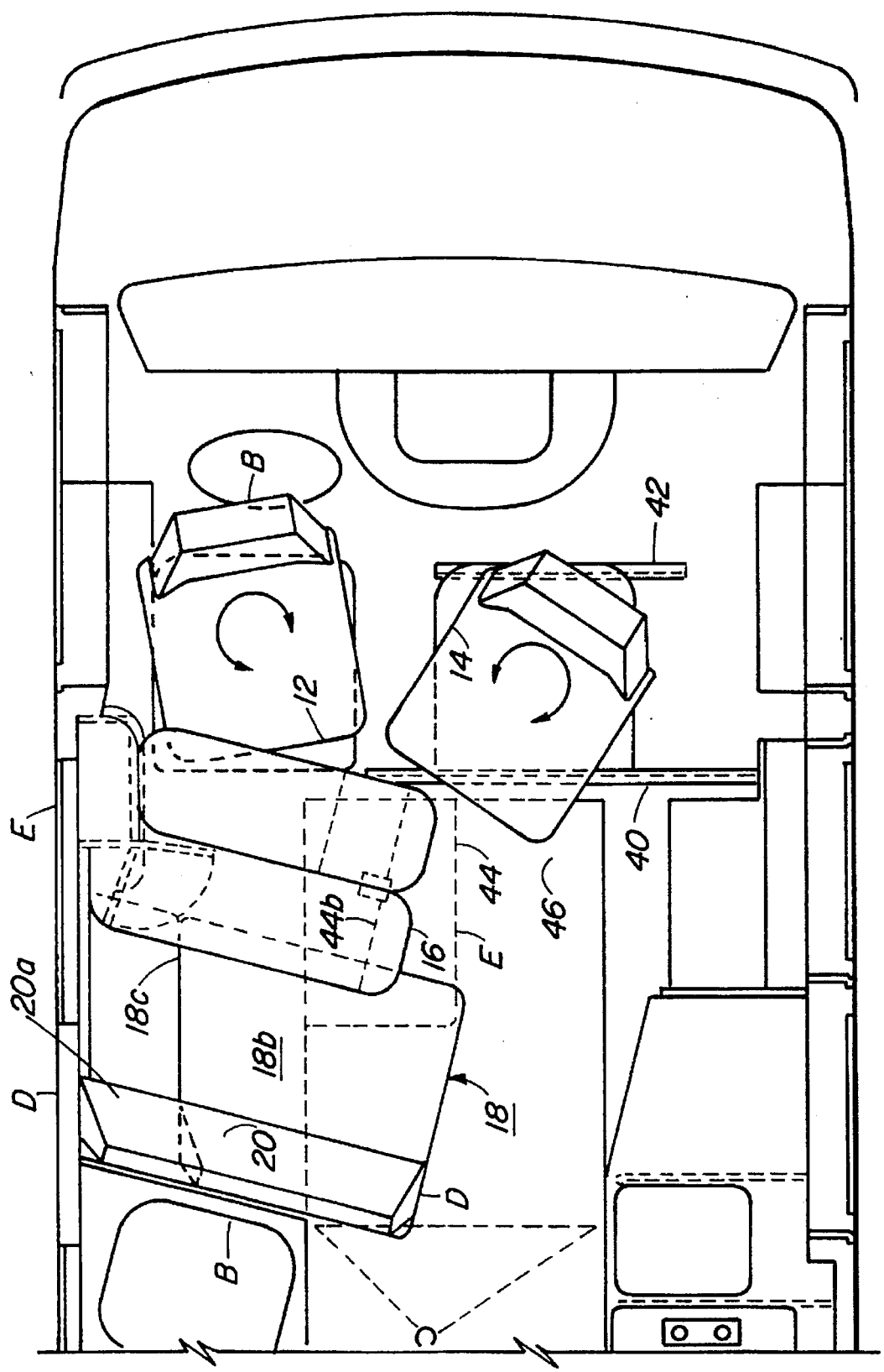

FIG. 5 shows the dinette mode for four persons. The driver seat 12 and the passenger seat 14 are turned to face the table 16. The passenger seat 14 is partially moved on its rear and front tracks 40 and 42 respectively towards the driver seat 12 and table 16. Rear seat cushion 18 and backrest 20 have been moved inward (sideways) and an extension seat cushion 18c and extension backrest 20a respectively placed in the spaces created. This extension forms a double seat for two persons.

Figure 6:
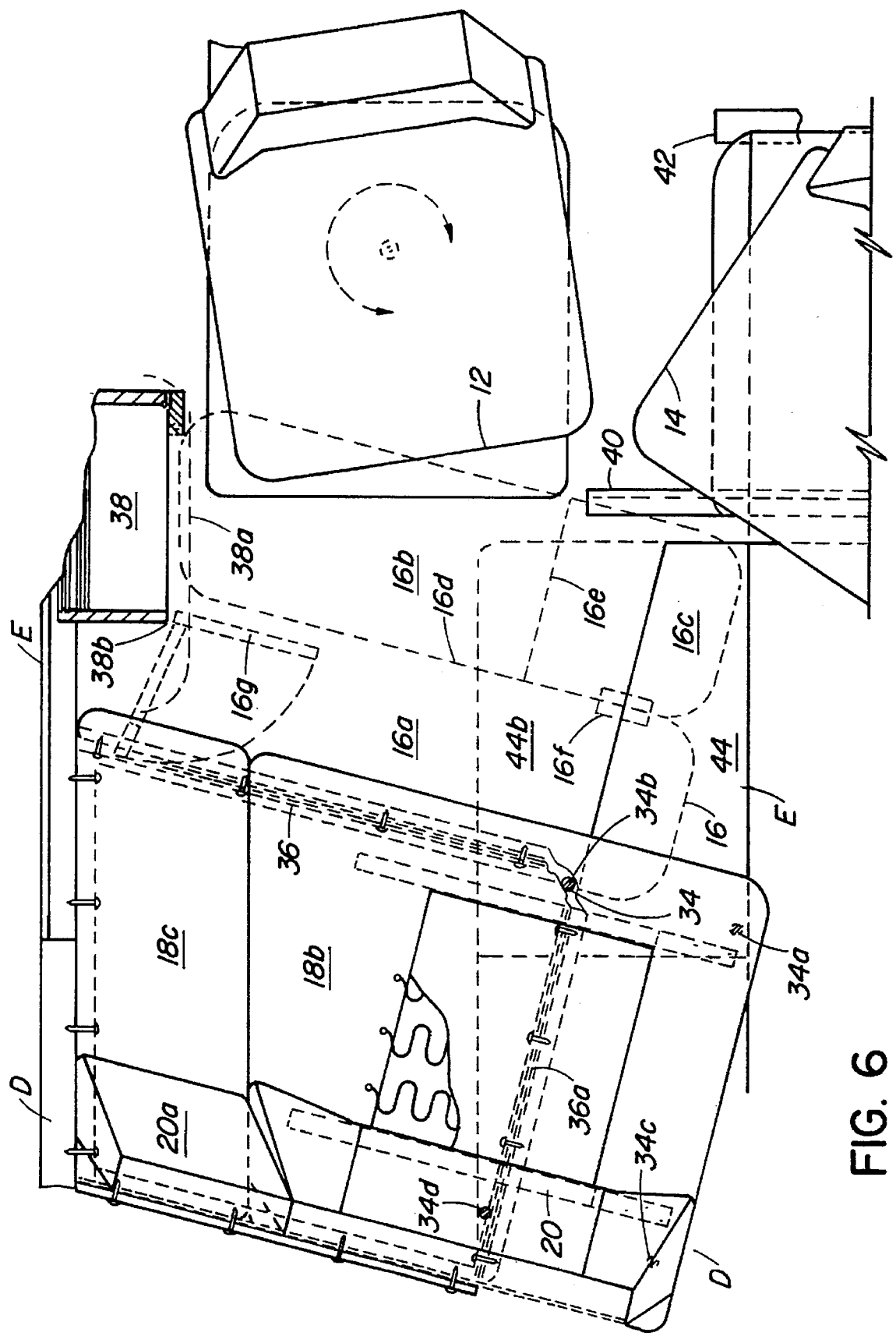
FIG. 6 shows a seating arrangement essentially the same as shown in FIG. 5. However the detail is similar to that shown in FIG. 4 and described thereunder, except it is a dinette arrangement for four persons instead of two.

FIG. 6 also shows the dinette mode for four persons similar to FIG. 5 but on a larger scale for clarity of the workings of the rear seat cushions 18b and 18c and backrests 20 and 20a and cantilevered table 16 respectively. As can be clearly seen in FIG. 6, by extending rear seat cushion 18b inward (sideways), hole 34b in seat cushion base 18a now fits over knob 34. Seat cushion 18b is now cantilevered over the side wall 36a (edge) of seat base 36 but is held horizontal by the angle 28 in slot 32. The backrest 20 is also moved inward (sideways) by lifting it from its set of three tracks 22 and 24 and engaging it on two sets of tracks 22 and 24 which will keep the backrest 20 in a vertical position. Backrest cushion 20a is engaged in a similar manner in the empty space created. The extension seat cushion 18c is inserted in the space created by the sideways extension of seat cushion 18b.

Table 16 is shown in dashed lines in FIG. 6 and as said before consists of three leafs, 16a being the main leaf; 16b is hinged 16d to main leaf 16a and leaf 16c is hinged 16e to leaf 16b. A rigid plate 16f is fastened to the bottom of leaf 16a; this plate 16f supports leaf 16c in its extended (unfolded) position. Similarly leaf 16b when extended (unfolded) rests on the top 38a of the wall cabinet 38 which supports the cantilevered table 16. This table 16 is also further supported by a pivoting bracket 16g under the table 16 and is hinged at 38b on cabinet 38.

Figure 7:
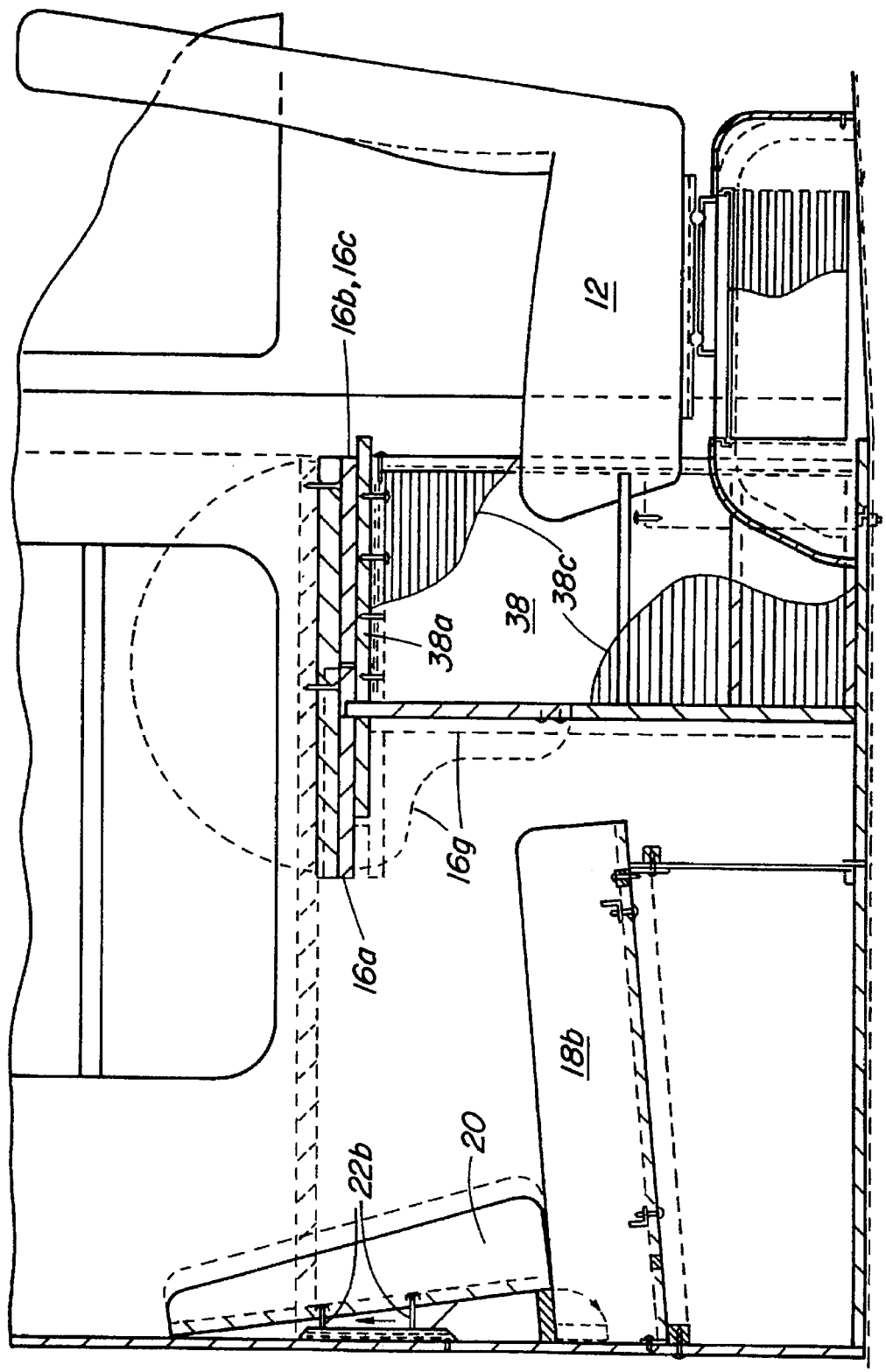
FIG. 7 is a section view generally along line B—B as can be seen and is indicated on FIGS. 4 and 5; the cabinet below the window with the cantilevered table unfolded for dining is shown in this FIG. 7.

FIG. 7 is a section at B—B as shown on FIGS. 4 and 5 and shows a dinette for two persons. Table 16 shows fully extended with leafs 16b and 16c unfolded. The cabinet 38 roll-up door 38c is in the closed position.

Figure 8:
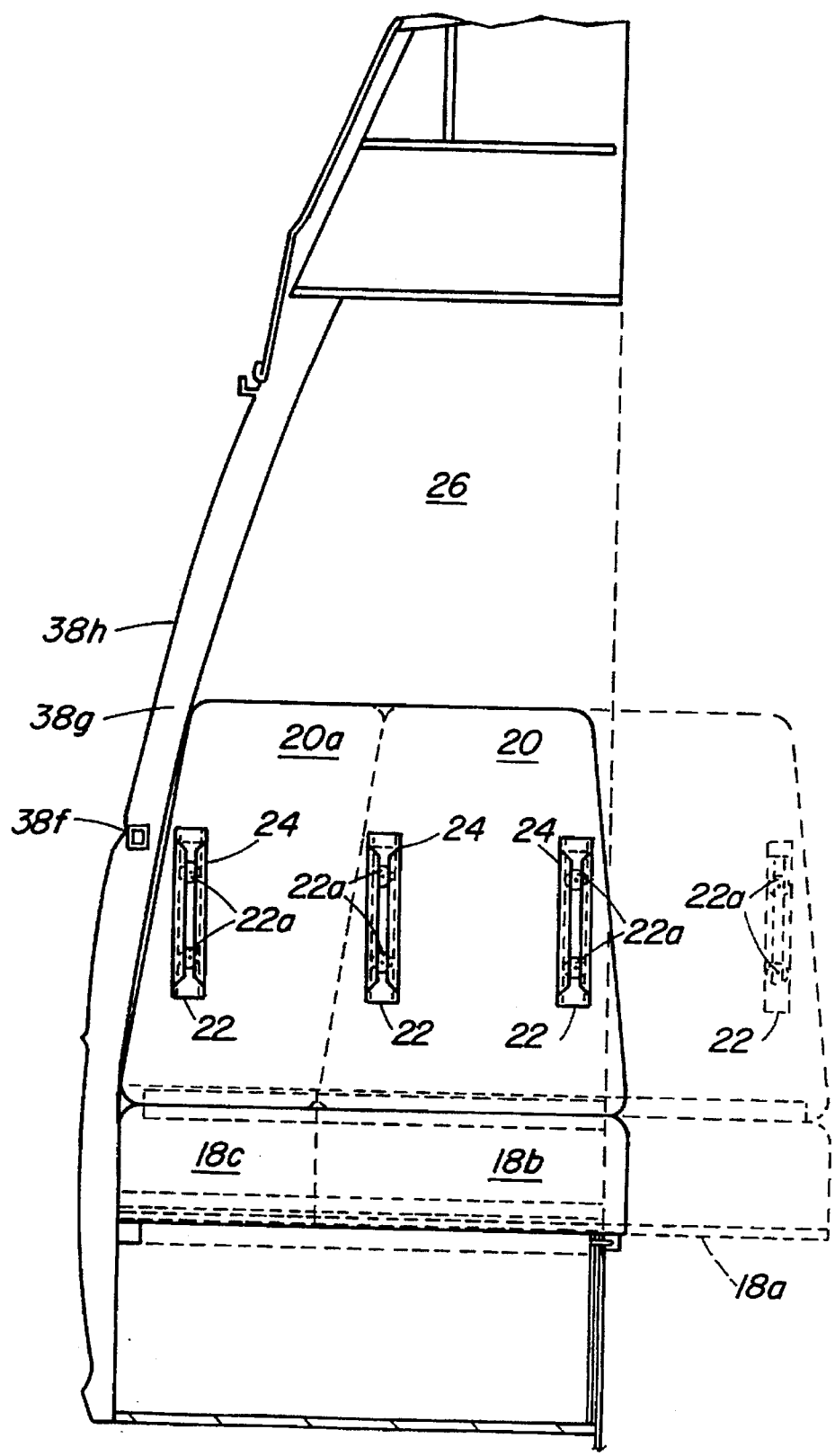
FIG. 8 is a section view along line C—C of the rear seat, the general location of which is indicated on FIGS. 2 and 4 for the single seat in solid lines and in dashed lines for the extension of the seat for two persons as can be seen as D—D in FIGS. 5 and 6.

FIG. 8 shows the female tracks 24 on partition 26 and male tracks 22 on backrest cushions 20 and 20a respectively. The solid lines show the seat cushion 18b and the backrest cushion 20 in the mode for one person. The dashed lines show these cushions 18b and 20 and extension cushion 18c and 20a in the extended mode for two persons. Metal washers 22a on bolts 22b slide in female tracks 24 thereby holding backrests 20 and 20a in an upright position.

FIG. 9 shows a cross section of the table cantilevered from the wall cabinet 38 and also supported by the pivoting bracket 16g which is hinged at 38b on wall cabinet 38. Main table leaf 16a is inserted in a slot 16h. Back panel 38d of wall cabinet 38 extends to a horizontal member 38e which is securely fastened to back panel 38d. Horizontal member 38e is additionally supported above it by horizontal steel tubing 38f. This steel tubing 38f is secured on both ends on a vertical member 38g in the exterior van wall 38h. A wing bolt 38c prevents the table 16 from slipping out of slot 16h. The floor extension 44 (above the dropped floor 46) is shown in dashed lines with its hinged supports 44a in their lowered position. This floor extension 44 is very convenient when seat cushion 18b is extended sideways to seat two persons at the dinette table 16. The floor extension 44 is not required for a single seat 18; it is then suspended under the fixed floor 44b for storing.

FIG. 10 shows an arrangement for a single bed. Driver seat 12 is turned facing inwards, table 16 is lowered down to rear seat base 36 level and is resting on a strip 36b which is secured near the upper edge of seat base 36. The front corner of main table leaf 16a rests on a support 38d secured on the front corner of the wall cabinet 38. A screw 38e projecting from the top of said support 38d fits in a corresponding hole in main table leaf 16a and a corner bracket 38f is secured on the rear inward corner of wall cabinet 38 at the height of table 16 when in the lowered position to prevent the table from tipping when pressure is applied to the opposite end of the table 16 thereby holding it in a secure position when forming the base for either a single or double bed arrangement. The inward end of table leaf 16b is supported by table leaf 16c which is pivoted to a vertical position, resting on the fixed floor 44b above the dropped floor 46. Seat cushion 18b is moved forward resting on the lowered table 16. Hole 34c in seat cushion base 18a is thereby fitted over knob 34 which is located at the inward and forward corner of the seat base 36, thereby retaining seat cushion 18b in its location. The front edge of seat cushion 18b abuts the adjoining side of driver seat 12. Backrest 20 is here seen lowered to a horizontal position. The male tracks 22 are shown dashed lines.

FIG. 11 shows the arrangement for a double bed. Seat base 36 is shown in solid lines. Seat backrests 20 and 20a and seat cushions 18b and 18c respectively are shown in the double bed sideways extended position. The driver seat 12 and the passenger seat 14 face one another and abut seat cushions 18b and 18c to form a double bed.

FIG. 12 also shows the arrangement for a double bed but on a larger scale for clarity of detail. Both driver seat 12 and passenger seat 14 are turned to face one another. Passenger seat 14 is moved on its tracks and 42 to abut driver seat 12. (Details regarding the lowering of the table 16 are described earlier in reference to FIG. 10.) Seat cushions 18b and 18c are moved forward and are resting on the lowered table 16. Hole 34d in seat cushion base 18a is thereby fitted over the knob 34 which is located at the inward and forward corner of the seat base 36, thereby retaining seat cushion 18b in its location. Back rests 20 and 20a are here seen lowered to a horizontal bed position.

FIG. 13 shows a section through F—F indicated on FIGS. 11 and 12. It shows the seating in a bed position. An angle 20b which is secured to backrest 20 hooks over angle 28, which is secured to cushion base 18a thereby holding the backrest 20 in a secure horizontal position.

FIG. 14 is a cross section through G—G as indicated on FIGS. 11 and 12. The table leaf 16a rests on support 38d. Table leaf 16c is in a vertical position thereby supporting table leaf 16b at its hinged end. The slot 16h in exterior wall 38h for table 16 to be inserted when in the raised position can be clearly seen in FIG. 14. Also the storage of floor extension 44 under fixed floor 44b can be seen here. The floor extension 44 when stored is kept from sliding from its ledges 44d (tracks) by a horizontal hook (not shown) secured under the floor extension 44 and hooked into an eye (not shown) in the side of the dropped floor 46. This same hook and eye is also employed when the floor extension 44 is in its extended position as it is simply reversed in direction. Leg supports 44a and 44c are held in a horizontal position by turn buckles 44e when floor extension 44 is stored.

FIGS. 15 to 24 show the detail of the front passenger and driver seat bases 50 and 51 respectively. The outside enclosures 52 consist of a contoured composite material with roll-up doors 54 on both sides, which run in vertical tracks (grooves) 56, which become horizontal at the top of the outside enclosure 52. Roll-up doors 54 can be opened by lifting the knob 55. This outside enclosure 52 is secured to an inside framework consisting of two square metal tubings 58 running horizontally under the top of the enclosure 52 and curving downward to a short U channel 60 at the front and a longer U channel 62 at the rear of the enclosure 52. The square tubings 58 are secured (welded) to the channels 60 and 62 respectively. The lower flanges of channels 60 and 62 hook into corresponding slotted tracks 64 at the front and 66 at the rear of the enclosure 52. These tracks 64 and 66 are bolted 68 through holes in the van floor 69 and U channels 70 where required. Rollers 72 are bolted 74 through a hole in the U channels 60 and 62 at the front and rear of the enclosures 52 respectively. These rollers 72 permit the seat base 50 to move sideways, riding on tracks 64 and 66 respectively. A barrel bolt 76 secured to square tubings 58 via a metal plate 78, welded to said tubings 58, keeps the seat base 50 from moving sideways when said barrel bolt 76 is engaged in a hole in the van floor 69. Further, a metal plate 80 is welded to each end of the rear U channel 62. The metal ends 82 of the seat belts 84 (partially shown) are bolted 86 through holes in the metal plates 80. Swivel bases 88 and 90 are welded to the square tubings 58 of the passenger 50 driver 51 sear base respectively. The enclosures 52 are placed over the inside framework with the swivels 88 and 90 protruding through an opening 92 in the top of enclosure 52. The enclosures 52 are secured to the inside frame work by screws 94 in the square tubings 58 at the front of the enclosures 52 and is held by the seat belt anchorage bolts 86 at the two rear outside corners of the enclosures 52.

The driver seat base 51 is fixed to the van floor 69, as can be seen in FIGS. 16, 17, 20, 21, 23 and 24, by metal angles 102 located at the front and rear of the seat base 51. These angles 102 are welded to the square tubings 58 on both ends and bolted 104 through holes in the van floor 69. The metal ends 82 of the seat belts 84 are bolted 104 through holes in metal brackets 106 which are connected to the horizontal flanges of angles 102. These brackets 106 are also bolted 104 through holes in the van floor 69.

To summarize, there has been described a system or structure allowing conversion of the front area seating of a van to a dinette for two and/or four persons and to a single and/or double bed. The structures provided enable the front passenger seat to rotate 360 degrees and slide over a position adjacent to the driver seat which also can be rotated 360 degrees. The single seat directly behind the driver seat can be extended sideways to form a double seat. The table in between the front seats and seat directly behind these seats is cantilevered from a wall cabinet located below the window, which is located in the exterior sidewall directly behind the driver seat. This table is removable at will for storage in a coat, closet or lowered to serve as a base for a single double bed. The two part hinged front leaf may be folded back over the main rear leaf to allow ample space for the driver seat to slide back and forth on tracks when in the forward driving position. When the table is lowered to the bed base position, the rear seat cushion(s) is moved forward thereby resting on the lowered table. The back rest(s) is lowered into the location of the seat cushion. The two front seats are rotated to face one another with the passenger seat slid over to a position directly adjacent the driver seat. The arrangement makes for a double bed or a single bed if only the driver seat and the cushions (without the extensions) of the rear seating are used.

I claim:

1. A recreational vehicle including, within a forwardly disposed region of the vehicle interior:

a driver's seat and a front passenger seat located generally in a side-by-side relationship adjacent a frontal portion of the vehicle interior;

a rear passenger seat located rearwardly of the driver's seat in spaced relation thereto;

a table locatable in the space between the rear passenger seat and the driver's seat;

said driver and front passenger seats being mounted for rotation about respective vertical axes to enable them to face forwardly in a driving mode, to face generally rearwardly in a dining mode and to face each other in a sleeping mode;

said front passenger seat also being movable laterally of the van interior toward and away from the driver's seat to enable the front passenger seat and driver's seat to be placed in close relation to each other;

said rear passenger seat including movable cushions enabling same to be converted into a portion of a bed;

means for supporting said table at a high level dining position and also at a lower level sleeping position compatible with the levels of the rear passenger seat and said driver and front passenger seats for support of cushions on said table thereby to define together with said converted rear passenger seat and at least said driver's seat a bed for use in the sleeping mode.

2. The recreational vehicle of claim 1 wherein said rear passenger seat includes a seat cushion and a backrest cushion, said seat cushion being positionable on said table when in the lower level sleeping position and said backrest cushion being movable to a horizontal position rearwardly of the seat cushion to form a part of the bed.

3. The recreational vehicle of claim 2 wherein said seat cushion and backrest cushion are adjustable inwardly or outwardly relative to the longitudinal centre line of the van interior to provide increased bed width in the sleeping mode and to provide increased seating width when in the dining/sitting mode.

4. The recreational vehicle of claim 3 further including auxiliary cushions insertable between said seat and backrest cushions and an adjacent portion of the vehicle sidewall when the latter cushions have been adjusted laterally.

5. The recreational vehicle of claim 1 wherein said table comprises a plurality of leaves hinged together so that said leaves may be folded into close juxtaposition with one another to conserve/provide extra space.

6. The recreational vehicle of claim 5 including means for supporting said table in cantilever fashion from an end of the table adjacent a sidewall of the vehicle when in the high level dining position.

7. The recreational vehicle of claim 3 wherein said vehicle includes a dropped floor section, and a floor extension movable over a portion of the dropped floor section to provide extra foot room when said rear passenger seat and backrest cushions have been adjusted inwardly toward said centre line.

8. The recreational vehicle of claim 1 wherein said driver and front passenger seats are supported on respective seat bases, each defining an enclosure for storage, and the base for said passenger seat being mounted on tracks to provide said lateral movement, and stop means to secure the movable seat base in selected lateral positions.

9. A recreational vehicle including, within a forwardly disposed region of the vehicle interior:

a pair of frontal seats located generally in a side-by-side relationship adjacent a frontal portion of the vehicle interior;

a rear passenger seat located rearwardly of one of said frontal seats in spaced relation thereto;

a table locatable in the space between the rear passenger seat and said one frontal seat;

said frontal seats being mounted for rotation about respective vertical axes to enable them to face forwardly in a driving mode, to face generally rearwardly in a dining mode and to face each other in a sleeping mode;

the other of said pair of frontal seats also being movable laterally of the van interior toward and away from said one frontal seat to enable said frontal seats to be placed in close relation to each other;

said rear passenger seat including movable cushions enabling same to be converted into a portion of a bed;

means for supporting said table at a high level dining position and at a lower level sleeping position compatible with the levels of the rear passenger seat and said frontal seats for support of cushions on said table thereby to define together with said converted rear passenger seat and at least one of said frontal seats a bed for use in the sleeping mode.

10. The recreational vehicle of claim 9 wherein said rear passenger seat includes a seat cushion and a backrest cushion, one said cushion being positionable on said table when in the lower level sleeping position and the other said cushion being movable to a horizontal position adjacent said one cushion to form a part of the bed.

11. The recreational vehicle of claim 10 wherein said seat cushion and backrest cushion are adjustable inwardly or outwardly relative to the longitudinal centre line of the van interior to provide increased bed width in the sleeping mode and to provide increased seating width when in the dining/sitting mode.

12. The recreational vehicle of claim 11 further including auxiliary cushions insertable between said seat and backrest cushions and an adjacent portion of the vehicle sidewall when the latter cushions have been adjusted laterally.

13. The recreational vehicle of claim 9 wherein said table comprises a plurality of leaves hinged together so that said leaves may be folded into close juxtaposition with one another to conserve/provide extra space.

14. The recreational vehicle of claim 13 including means for supporting said table in cantilever fashion from an end of the table adjacent a sidewall of the vehicle when in the high level dining position.

15. The recreational vehicle of claim 11 wherein said vehicle includes a dropped floor section, and a floor extension movable over a portion of the dropped floor section to provide extra foot room when said rear passenger seat and backrest cushions have been adjusted inwardly toward said centre line.

16. The recreational vehicle according to claim 9 wherein said one frontal seat is a driver's seat and the other of the frontal seats is a passenger seat.

17. The recreational vehicle according to claim 16 wherein said driver and front passenger seats are supported on respective seat bases, each defining an enclosure for storage, and the base for said passenger seat being mounted on tracks to provide said lateral movement, and stop means to secure the movable seat base in a desired lateral position.

18. A recreational vehicle including, within a forwardly disposed region of the vehicle interior:

a driver's seat and a front passenger seat located generally in a side-by-side relationship adjacent a frontal portion of the vehicle interior;

a rear passenger seat located rearwardly of the driver's seat in spaced relation thereto;

a table locatable between the driver's seat and the rear passenger seat wherein said table comprises a plurality of leaves hinged together so that said leaves may be folded into close juxtaposition with one another to conserve/provide extra space; and means for supporting said table in cantilever fashion from an end of the table adjacent a sidewall of the vehicle when in a generally horizontal dining position.

19. A recreational vehicle including, within a forwardly disposed region of the vehicle interior:

a driver's seat and a front passenger seat located generally in a side-by-side relationship adjacent a frontal portion of the vehicle interior;

a rear passenger seat located rearwardly of the driver's seat in spaced relation thereto;

said front passenger seat also being movable laterally of the van interior toward and away from the driver's seat to enable the front passenger seat and driver's seat to be placed in close relation to each other;

wherein said driver and front passenger seats are supported on respective seat bases, and the base for said passenger seat being mounted on tracks to provide said lateral movement, and stop means to secure the movable seat base in a desired lateral position.

20. The recreational vehicle of claim 19 wherein each seat base defines an enclosure for storage.

21. A recreational vehicle including, within a forwardly disposed region of the vehicle interior:

a driver's seat and a front passenger seat located generally in a side-by-side relationship adjacent a frontal portion of the vehicle interior;

a rear passenger seat located rearwardly of the driver's seat in spaced relation thereto;

a table locatable in the space between the rear passenger seat and the driver's seat;

said rear passenger seat including movable cushions enabling same to be converted into a portion of a bed;

means for supporting said table at a high level dining position and also at a lower level sleeping position compatible with the levels of the rear passenger seat and said driver and front passenger seats for support of cushions on said table thereby to define together with said converted rear passenger seat and at least said driver's seat a bed for use in the sleeping mode;

said movable cushions being adjustable inwardly or outwardly relative to the longitudinal centre line of the van interior to provide increased bed width in the sleeping mode and to provide increased seating width when in the dining/sitting mode; and wherein said vehicle includes a centrally located dropped floor section, and a floor extension movable over a portion of the dropped floor section to provide extra foot room when said movable cushions have been adjusted inwardly toward said centre line.

* * * * *